United States Patent [19]
Hiraiwa

[11] 4,267,907
[45] May 19, 1981

[54] CLUTCH CONTROL APPARATUS OF AN AUTOMOTIVE POWER TRANSMISSION

[75] Inventor: Kazuyoshi Hiraiwa, Ome, Japan

[73] Assignee: Nissan Motor Company, Limited, Yokohama, Japan

[21] Appl. No.: 963,344

[22] Filed: Nov. 24, 1978

Related U.S. Application Data

[63] Continuation of Ser. No. 728,966, Oct. 4, 1976, abandoned.

[30] Foreign Application Priority Data

Oct. 6, 1975 [JP] Japan .................. 50-119691

[51] Int. Cl.³ ............... B60K 41/22; F16D 67/00
[52] U.S. Cl. .................................. 192/3.56
[58] Field of Search ..................... 192/3.56, 3.58

[56] References Cited

U.S. PATENT DOCUMENTS 3,910,388  10/1975  Moori .................. 192/3.56
4,158,404   6/1979  Yamashita ........... 192/3.56

*Primary Examiner*—George H. Krizmanich
*Attorney, Agent, or Firm*—Robert E. Burns; Emmanuel J. Lobato; Bruce L. Adams

[57] ABSTRACT

An electrically operable clutch is engaged upon opening of a clutch control circuit. The circuit comprises a first switch on a gear shift lever which is closed while the shift lever is pushed away from the driver, a second switch on the lever which is closed while the shift lever is pulled toward the driver, a third, usually closed switch which is opened only when the shift lever reaches a shift position short of either one of the fully pushed position or the fully pulled position, a fourth, usually closed switch which is opened only when the shift lever reaches a shift position short of the fully pushed position and a fifth, usually closed switch which is opened only when the shift lever reaches a shift position short of the fully pulled position, wherein each said shift position short of the fully pulled or pushed position is so determined that synchronizing process in the transmission is substantially terminated in this position. The third, fourth and fifth switches are connected in parallel with one another, while the first and second switches are connected respectively in series with the fourth and fifth switches.

3 Claims, 8 Drawing Figures

CLUTCH CONTROL APPARATUS OF AN AUTOMOTIVE POWER TRANSMISSION

This is a continuation of application Ser. No. 728,966 filed Oct. 4, 1976, now abandoned.

BACKGROUND OF THE INVENTION

This invention generally concernes transmission systems of motor vehicles and more particularly to clutch control circuits for automatic engagement and disengagement of clutches in the transmissions to permit gear change operation of the transmissions.

A variety of clutch control systems are proposed for automatic control or actuation of clutches which do not require attention of the driver and simplify gear shift operation by him. A typical arrangement of them is that a clutch forming part of the clutch control circuit is mounted on the gear shift lever so that the clutch is engaged and disengaged in direct response to manipulation of the gear shift lever by the driver. As soon as the gear shift lever is touched or grasped by the manipulator, an automatic clutch is disengaged enabling manual or power-assisted gear shift operation. When the driver takes his hand off the gear shift lever after completing the gear shift operation, the clutch is again engaged for transmitting torque of engine to the transmission. Other switches indicative of engine operating condition such as engine acceleration may additionally be provided, if desired.

In such arrangement, there is a difficulty in that some failure or breakage at any one switch or at any part of the circuit line immediately disables the engagement and disengagement of the clutch being required for gear shift operations. This results in that shift operation is rendered difficult, particularly from the neutral position to any drive position.

SUMMARY OF THE INVENTION

The present invention therefore has for its object to provide a clutch control circuit for a transmission of the kind referred to, which ensures engagement and disengagement of the clutch with some failure in a part of the clutch control circuit and therefore is free from the aforementioned drawbacks.

The clutch control circuit in accordance with the invention is especially characterized by three parallelly arranged switches E, F, G operable in dependence on gear change operation in the transmission, for instance, by pulling the gear shift lever toward driver or pushing it away from him/her. The fully pushed position of the shift lever provides, for instance, a first or low gear ratio and a third or high gear ratio, while the fully pulled position a second or intermediate gear ratio, a fourth or direct gear ratio and a reverse drive ratio. There is a neutral position between the pulled position and the pushed position.

The first E of the aforementioned switches is kept closed as long as gear shift lever is in its neutral position and is opened when it moves off the neutral position and reaches a predetermined counterpart position short of the pulled position or the pushed position. The second switch F is kept closed while the shift lever is in the neutral position or in the pulled position and is opened when it reaches a predetermined position short of the fully pushed position. The third switch G is in contrast closed while the shift lever is in the neutral position or in the pushed position and is opened when it reaches a predetermined position short of the pulled position. There are provided another part of switches A, B, one of which A is in series with the second switch and is closed as long as the driver is applying a force to push the lever, and the other switch B is in series with the third switch and is closed while the driver is applying a force to pull the lever. Consequently, the clutch control circuit is completed when both of the switches A and F or both of the switches B and G are closed or when the switch E is closed, whereupon the clutch is disengaged by a solenoid type clutch actuating means in the control circuit.

BRIEF DESCRIPTION OF THE DRAWINGS

Further objects, features and advantages of the invention will be better understood by reference to the following description of embodiment chosen by way of example, with reference to the accompanying drawings, in which.

Throughout the Figures, like and corresponding parts are indicated by the similar reference characters.

DESCRIPTION OF THE PREFERRED EMBODIMENTS

Figure 1:
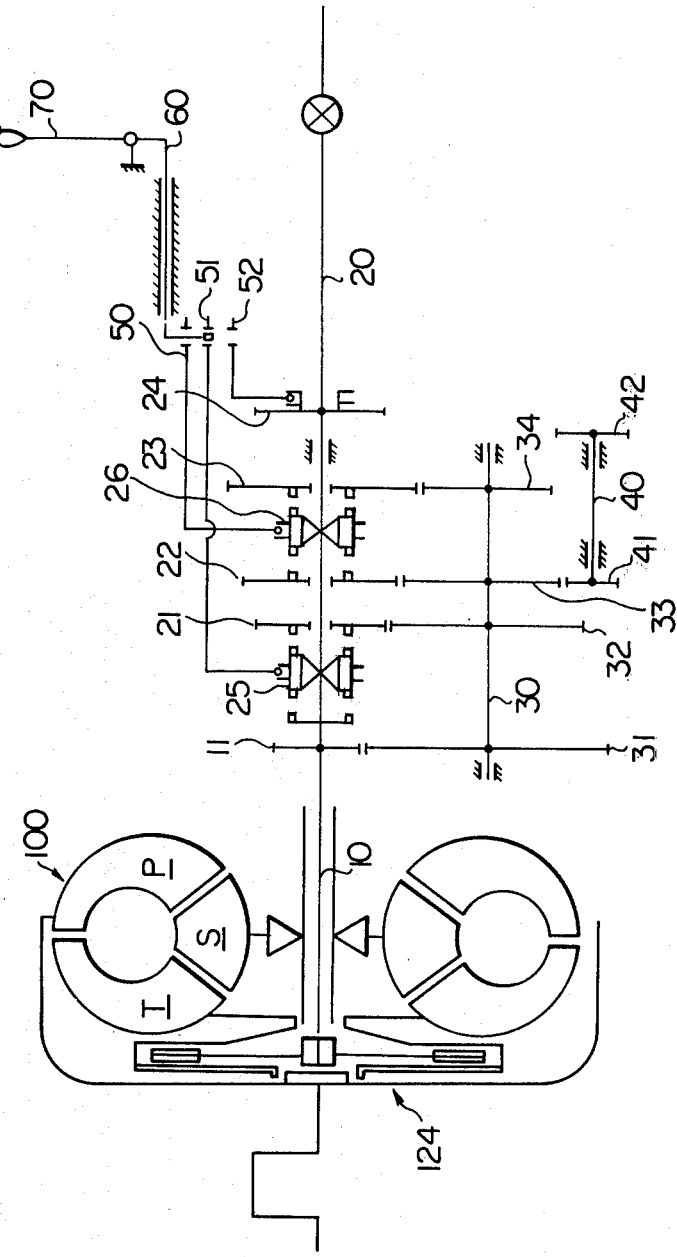
FIG. 1 is a general schematic view of a power transmission system adapted to incorporate a clutch control apparatus according to this invention.

FIG. 1 generally shows a transmission system to be equipped with the clutch control apparatus of the invention, which conventionally comprises a torque converter assembly 100 and a hydraulic clutch 124 housed in a torque converter cover to transmit torque from a turbine T of the torque converter to the transmission gear train, as will be later described in detail.

The turbine of the torque converter assembly turns a main drive shaft or transmission input shaft 10 through the clutch 124 mentioned above, the transmission input shaft being coaxially connected with a transmission output shaft or main shaft 20. A counter shaft 30 is arranged in parallel with the main shaft. A main drive gear 11 is mounted on the output end of the input shaft 10 to be rotatable therewith, while a gear 31 meshing with the gear 11 is mounted on the input end of the counter shaft 30. Further gears 21, 22 and 23 are mounted on the main shaft to be freely rotatable relative to the shaft 20. The gears 21, 22, 23 are respectively in constant engagement with gears 32, 33, 34 carried by the counter shaft 30. Extending in parallel with the counter shaft 30 is an idler shaft 40 which carries an idler gear 41 in mesh with the gear 33 on the counter shaft. Another gear 42 fixed on the idler shaft is engageable with the gear 24 which is mounted on the main shaft 20 to be axially slidable on the shaft while being rotatable together with it.

Synchronizer assemblies are spline-connected to the main shaft for axial sliding movement on the shaft and for rotation together with it, one 25 between gears 11 and 21 and the other 26 between gears 22 and 23. Each synchronizer assembly 25 or 26 is slidably moved on the shaft 20 by means of a shift rod 50 or 51 so that synchronizer ring (no numeral) engages the adjacent gear driven by the counter shaft to transfer the torque of the gear to the main shaft 20. The gear 24 is also axially moved by means of a corresponding shift rod 52. The shift rods are altogether connected to a link member or so-called striking rod 60 which is operable by the vehicle driver through a gear shift lever 70.

In operation of the power transmission illustratively shown in FIG. 1, the clutch 124 is disengaged for permitting gear shift operation by the vehicle driver, while it is engaged after the shift operation is terminated to transfer torque from the engine to the gear train, as will be fully described later. The gear ratios are changed between four forward drive ratios, a reverse drive ratio and a neutral position in the transmission shown.

By driver's manipulation of the gear shift lever, one of the shift rods is axially moved to selectively engage and disengage one of the synchronizer assemblies with the corresponding gear on the main shaft, in a manner as is generally known in this type of transmission. To provide the four forward drive ratios, the torque from the engine is thus transferred through the input shaft 10, main drive gear 11, counter shaft 30, the selected one of the gears on the main shaft and the corresponding one of the synchronizer assemblies to the main shaft 20. If the synchronizer assembly is engaged with the main drive gear 11, the main shaft 20 is directly driven by the input shaft 10 substantially representative of the revolution of the engine. For reverse drive ratio, the path of torque transmission additionally includes idler shaft and idler gears.

Figure 2:
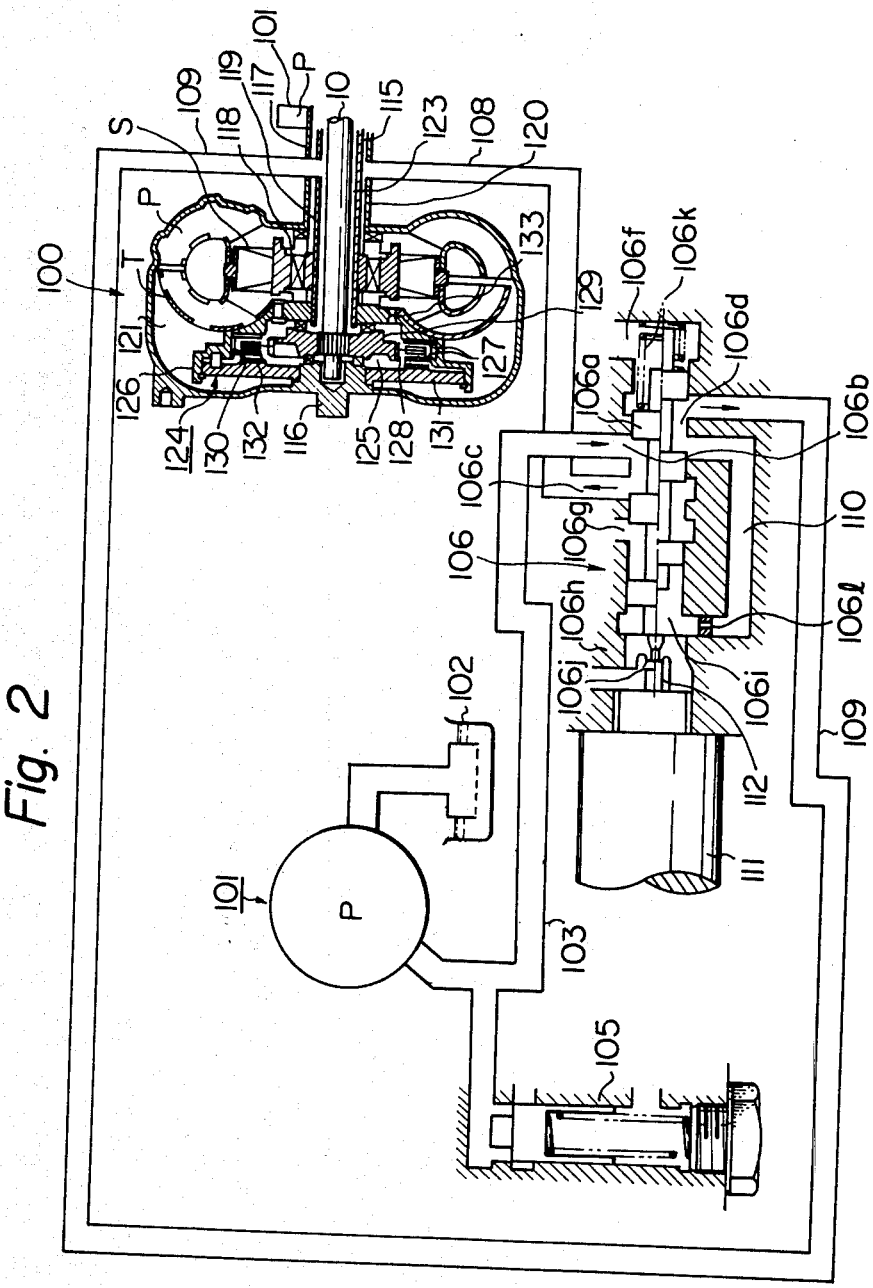
FIG. 2 is a schematic view of a clutch and a clutch actuating means adapted to be controlled by a clutch control apparatus of this invention.

FIG. 2 illustrates in detail the hydraulic clutch 124 housed in the torque converter assembly 100 and its hydraulic circuit employed in this invention. The hydraulic circuit for the clutch comprises an engine driven pump 101 for delivering pressurized oil to the hydraulic clutch through a delivery conduit 103, oil sump 102, a pressure regulator valve 105 to prevent an abnormal pressure rise in the conduit 103, and a shift valve 106 to selectively control the path of oil delivery to the clutch in dependence on a solenoid-operable clutch control apparatus 111 that will be specifically explained below.

The shift valve 106 is provided with a landed spool 106a axially slidable in an elongate bore (no numeral), the latter having one inlet port 106b, two outlet ports 106c, 106d and three drain ports 106f, 106g, 106h. The axial end of the bore adjacent the clutch control apparatus 111 is formed with a nozzle 106j for communication between an oil chamber 106i and the drain port 106h. The other axial end of the bore carries on its wall a spring 106k loading the spool 106a towards the clutch control apparatus.

The inlet port 106b is on one hand connected with the pump 101 through the oil delivery conduit 103 and on the other with the oil chamber 106a through a by-pass conduit 110 with a small orifice 106l. The outlet ports 106c, 106d are connected respectively with a conduit 108 and a conduit 109 as will be mentioned below. The nozzle 106j is rendered closed by a solenoid plunger 112 upon its deenergization by means of cluch control apparatus, while being kept open during energization of the solenoid.

The torque converter conventionally comprises an impeller P mounted on and driven by an engine output shaft 116, a stator S mounted through a one-way clutch 118 on a fixed hollow shaft 119 concentrically on the transmission input shaft 10, and a turbine T connected with the transmission input shaft 10 by way of the clutch assembly 124. The conduit 108 referred to communicates with an annular oil chamber 123 defined between the fixed shaft 119 and the shaft 10, which in turn communicates with an oil chamber 125 defined by a cylindrical clutch cover 126 and a clutch piston 131. Likewise, the conduit 109 communicates with an annular chamber 115 between the hollow shaft 119 and shaft 117 integral with the engine output shaft 116, which chamber communicates with the interior space 121 of the torque converter. The clutch cover 126 is integral with the turbine T of the torque converter and enclosed clutch plates 127 splined to the clutch cover and arranged on both sides of a clutch disc 128.

The clutch disc 128 is carried by a clutch hub 129 axially slidably splined to the output shaft. The clutch piston 131 is loaded by the oil pressure within the chamber 121 of torque converter to press the clutch plates 127 against the clutch disc 128, thus transferring torque from the turbine to the output shaft. Designated by numeral 130 is a cone-type cushion spring which alleviates an extreme friction being developed between the clutch plate and the clutch disc during engagement of the clutch. An aperture 132 is formed through the piston to permit displacement of oil across the piston during movement of the piston. A restricted passageway 133 through the clutch cover 126 allows a minor portion of the oil within the torque converter to be discharged through the chamber 125, annular chamber 123, conduit 109 and drain port 106f, thus preventing an excessive oil temperature rise in the torque converter.

When in operation the solenoid plunger 112 is energized by the apparatus 111 blocking the nozzle 106a, the oil pressure in the chamber 106a rises to move the spool 106a rightwardly in FIG. 2 to a position indicated by the lower half of the shift valve 106 in the drawing. Consequently, the inlet port 106b communicates with the outlet port 106d delivering oil through the conduit 109 and annular chamber 123 into the chamber 125 within the clutch. Since the oil pressure in the chamber 25 opposes to the oil pressure in the chamber 121, the piston 131 is in a clutch disengaging position. As the solenoid plunger 112 is then deenergized and retracted, the nozzle 106j is connected with the drain port 106h so that the pressure in the chamber 106i is decreased, though a limited amount of oil is yet passed into the chamber 106i through the conduit 110. The spool is then moved leftwardly and assumes the position indicated by the upper half of the valve 106 in the drawing. Oil is then delivered through the conduit 103, port 106b, port 106c, conduit 108, chamber 115 into the torque converter. The oil pressure thus passed into the chamber 121 urges the piston 131 to engage clutch plate 127 with the clutch disc 128, as previously mentioned.

Figure 3:
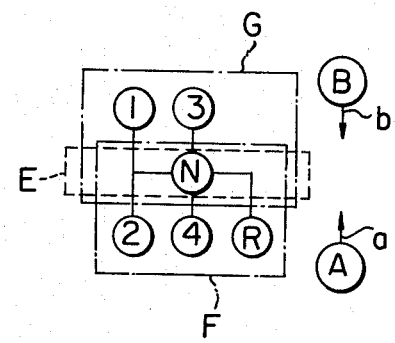
FIG. 3 is a diagrammatic illustration of gear shift positions to be selected by the gear shift lever and allocations of switches to the corresponding gear shift positions.

FIG. 3 diagrammatically shows the gear shift positions to be selected by the gear shift levers. As shown, the reference character 1 indicates the first drive position, 3 the third drive position, 2 the second drive position, 4 the fourth drive position, R the reverse drive position and N the neutral position. Furthermore, the arrow a indicates that the gear shift lever is pushed in this direction away from the driver, while the arrow b that the lever is pulled in this direction toward the driver. According to the invention, a switch A is located on the gear shift lever to be responsive to the push force applied to the lever. Switch B is likewise responsive to the pulling force applied to the lever. Further three switches E, F, G are provided to be responsive to the respective gear shift positions within the operational ranges as will be more apparent from the following description.

Figure 4:
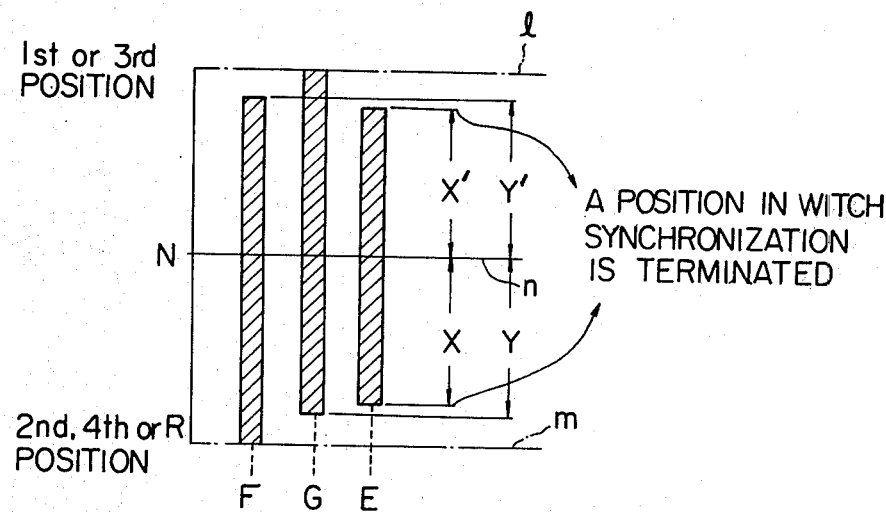
FIG. 4 is a diagrammatic illustration of the operational ranges within which the individual switches in the control circuit of this invention is operable.

The operational ranges within which the switches E, F, G are closed and opened are graphically shown in FIG. 4. In the Figure, the line 1 indicates the terminal position reached by the gear shift lever when the first or third drive position has been selected. Likewise, the line m indicates the terminal position of the shift lever when the second, fourth or reverse drive position has been selected. The intermediate line n indicates the shift lever being in the neutral position.

As shown, the switch E is kept closed in the neutral position of the shift lever while the transmission output shaft is yet on the way to synchronism with the corresponding gear with the aid of the synchronizer assembly. The switch E is then opened when the shift lever is moved by a distance X' in FIG. 4 that will be explained later in view of the structure, to a position short of the line 1 and when likewise it moves by the distance X to a position short of the line m. At these positions, synchronizing action in the transmission is subtantially terminated.

The switch F is closed as long as the shift lever is in the neutral position or in the shift position on the line m and is still maintained to be closed during shifting to the position on the line 1 until the shift lever is moved by the same distance X. The switch F is then opened only when the shift lever reaches the position short of the line 1 at which the switch E opens too. The switch G likewise opens only at the terminal end position of the distance X short of the line m, at which the switch E opens, too. Though all the switches E, F, G, are shown to open at the end of the distance X, it would be readily understood that the switches F and G may be somewhat later than the opening point of switch E, that is, when the shift lever moves by a distance Y (or Y') which is a little longer than the distance X, as shown in FIG. 4.

Figure 5:
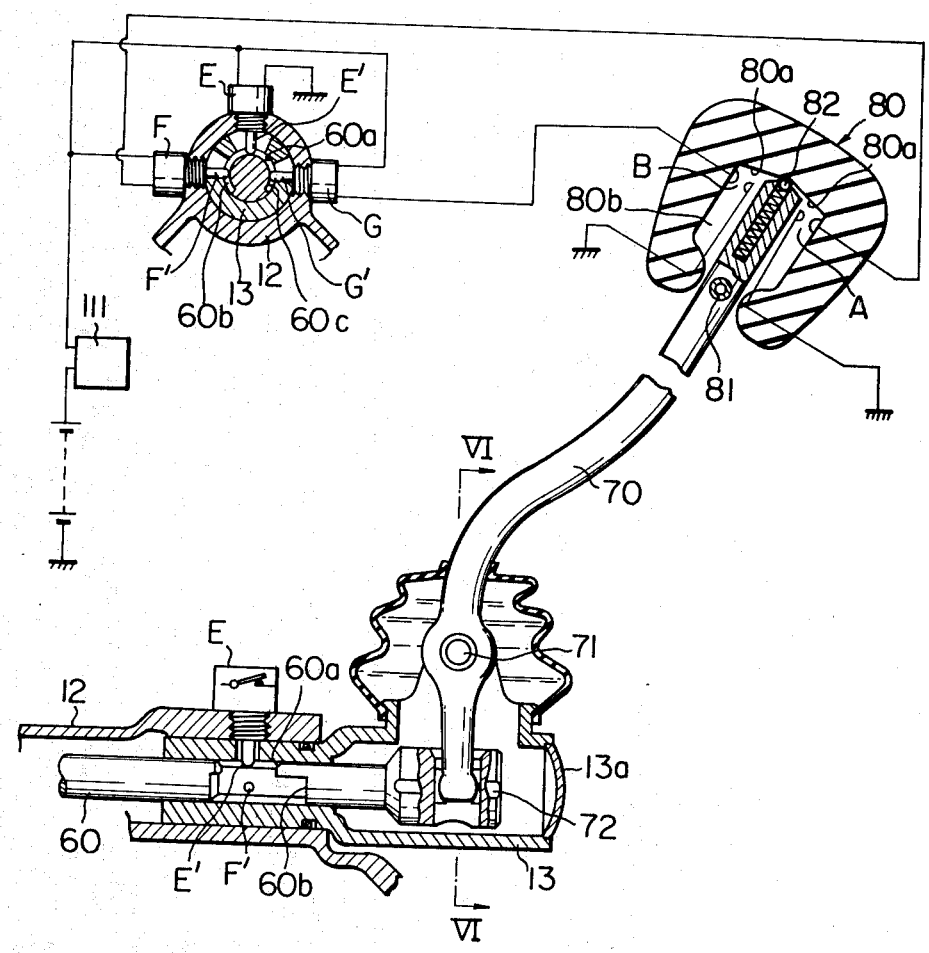
FIG. 5 is a schematic view showing a general location of the switches on or adjacent the gear shift lever according to this invention.
Figure 6:
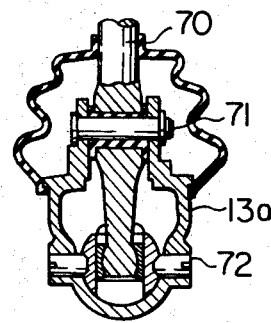
FIG. 6 is a section taken along line VI—VI of FIG. 5.

The actual location and arrangement of the switches is illustrated in FIG. 5, in which the same part of transmission with the switches E, F, G is shown both in the vertical section and in the lateral section. Indicated by numeral 12 is a rear end portion of the transmission housing in which a striking rod guide 13 is received to be rotatable relative to the transmission housing. The striking rod 60 is so fitted in the striking rod guide 13 as to be rotatable with the guide 13 while being axially slidable relative to the guide. The rear end of the striking rod guide 13 extends outwardly of housing 12 and forms a bulge 13a in which the gear shift lever 70 and the striking rod 60 are connected together in a manner to be mentioned below. As best seen in FIG. 6, the gear shift lever passes through an opening (no numeral) formed at the bulge 13a, at which the shift lever 70 is pivotally connected to the guide by means of a stud 71, so that the shift lever is swingable about the stud 71 in the both directions. Also, the lowermost end of the shift lever is securely received in the recess (no numeral) of the striking rod 60, which in turn is guided by two guide pins 82 fastened to the striking rod guide and received in grooves (no numeral) formed in the striking rod as shown. Accordingly, the striking rod 60 is axially slidable by swinging the shift lever 70 about the stud 71, while at the same time being rotatable about its axis together with the striking rod guide 13 by tilting the shift lever 70 about said axis. This movement of the striking rod 60 to a selected position provides the movement of the corresponding one of the shift rods for engagement of a synchronizer with a gear, as explained before in connection with FIG. 1.

With further reference to FIG. 5, the switches E, F, G of this invention are arranged circumferentially at a suitable distance on a portion of the transmission housing 12 to which the striking rod guide 13 is journaled. The respective switch housings are fastened to the wall of the transmission 12 as by screwing. Each switch is provided with a switch actuating pin E', F', G' which extends through the wall of the transmission housing 12 and further through a hole (no numeral) formed in the striking rod guide 13. The pins then reach the striking rod 60 and are received in the axial shallow grooves 60a, 60b, 60c formed circumferentially contiguously on the cylindrical surface of the striking rod, one for each switch actuating pin. All the switches are so designed that they are kept closed as long as their pins are engaged in the axial groove, while they are opened as soon as the pins ride over the cylindrical surface of the striking rod.

Figure 7:
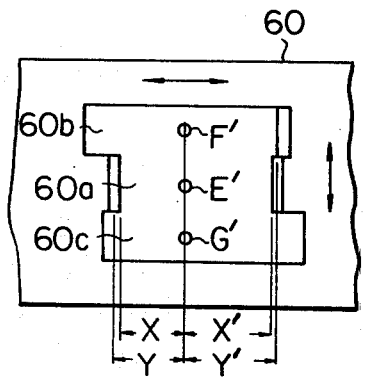
FIG. 7 is an exploded view of part of the gear shift lever associated with the switches according to the invention.

As is apparent from FIG. 7 in which the grooves are explodedly shown, the lengths of the grooves are determined to provide the operational ranges X and Y of the respective switches as already described in connection with FIG. 4. It is usually recognized that if clutch is engaged too early before the shift rod is moved by 60 to 80% of the total shift stroke, the shift operation is disabled. For this reason, the actual length of the axial groove corresponding to the stroke Y should be greater than 60% of the total stroke from the neutral position to the selected terminal shift position. The widths of the grooves are, on the other hand, so determined that any of the switch actuating pins should not rid over the cylindrical surface of the striking rod by angular displacement of the striking rod with the guide 13.

The end of the shift lever remote from the striking rod is formed with a knob 80 to be grasped by the driver. The knob 80 is pivoted to the shift lever 70 by means of a pivot pin 81 so that it is tiltable about the pin 81 relative to the shift lever in the arrow-indicated directions in which the shift lever itself is swingable. The knob 80 defines by both side walls and a top wall 80a of inversed V shape a cavity 80b into which the end of the shift lever extends. The knob is usually maintained in a neutral position by means of a spring-loaded ball 82 carried by the shift lever being engaged in the recessed center portion of the top wall 80a. This permits a limited tilting movement of the knob 80 relative to the lever 70. The cavity 80b accommodates the switches A and B of pressure contact type on either side of the shift lever 70, as shown. The switch A is thus closed by exerting a push force to the knob, while the switch B is closed by a pulling force exerted to the knob 80.

Figure 8:
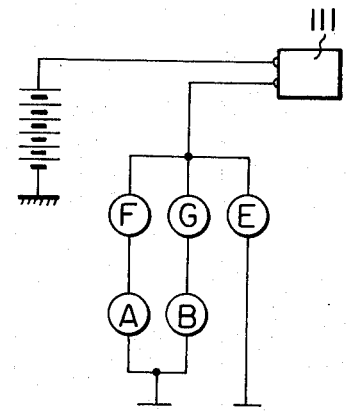
FIG. 8 is a circuit diagram of the clutch control apparatus with the switches according to this invention.

The electrical connection of these switches is obvious from the block diagram in FIG. 8. As shown, the switches E, F, G are in parallel with one another connected to the solenoid actuating device 111 in FIG. 2, whereas switches A and B are serially connected respectively with the switches F and G.

The operation of the above specified construction of the clutch control apparatus is now described below.

When the transmission stands in a neutral position, the switch E is kept closed to energize the solenoid 112. This results in disengagement of the hydraulic clutch in FIG. 2 in a manner already mentioned.

If shifting to the first or third drive ratio is desired, the shift lever is pushed in the direction indicated by a in FIGS. 3 and 5, whereupon the switch A is closed. The switches E and F are both closed in the incipient operation of the shift lever so that the clutch is yet maintained to be disengaged. When the shift lever is further moved to slide the striking rod enough to exceed the stroke X', the switch E is opened and then the switch F is also opened after further movement of the striking rod by the stroke Y'. This results in engagement of the clutch in a described manner. It should be readily understood that at this time of clutch engagement, the synchronization process has approximately been accomplished. Upon further movement of the shift lever, the synchronization is then completed and torque from the engine is smoothly transferred to the transmission.

When shifting back from this condition to the neutral position, the switch B is closed because the driver pulls the shift lever towards him/her. In the meantime the switch G is kept closed so that the solenoid is energized to disengage the clutch. As soon as the driver removes his/her hand from the shift lever knob, the switch B is opened, however the clutch is kept disengaged since the switch E is now closed.

When the shift lever is pulled to shift from the neutral position to the second, fourth or reverse position, the switch B is closed, and the switch G kept closed in the meantime. When the striking rod is moved more than the stroke Y, the switch G is opened, while the switch E is already open at this time. The clutch is thus engaged after synchronizing operation.

Shifting operation from this forward drive ratio to the neutral position would be apparent by reference to the foregoing explanation in conjunction with the shifting operation from the first or third position to the neutral one.

According to the invention, it would be appreciated that clutch engagement and disengagement is ensured by the double channels of circuit, one including the switch E and the other including switches A, F or B, G. If failure occurs in one of the channels, the other sound channel enough compensates for that channel in failure to engage or disengage the clutch. This obviates such inconvenience that the clutch is engaged before synchronization is terminated, or that it is yet disengaged after completion of synchronization.

What is claimed is:

1. A power transmission system of an engine driven vehicle having a change-gear transmission with an input shaft and an output shaft; a plurality of drive gears of different numbers of teeth freely rotatably mounted on the output shaft and constantly driven from the input shaft; a plurality of synchronizing assemblies mounted on the output shaft for slideable movement thereon, each said synchronizing assembly being slidably engageable with a corresponding drive gear for synchronization between the gear and the output shaft; a driver-operable gear shift lever having a neutral position and a plurality of gear shift positions including at least a first shift position and a second shift position in which the synchronizing assemblies engage corresponding drive gears respectively; a link rod axially reciprocally movable with the gear shift lever for slide movement of the synchronizing assemblies by a predetermined stroke from the neutral position to the first shift position or to the second shift position; an electrically operable clutch to transmit torque of an engine to the transmission; and a clutch control circuit comprising an electric actuator providing engagement of said clutch in response to opening of said clutch control circuit, a first switch located in the gear shift lever to be closed while the driver is applying a force to move the gear shift lever toward the first shift position, a second switch located on the gear shift lever to be closed while the driver is applying a force to move the shift lever toward the second shift position, a third, usually closed switch operatively associated with the link rod and connected in parallel with the first and second switches to be opened both when the link rod moves by 60 to 80% of the predetermined stroke from the neutral position to the first shift position and when the link rod moves by 60 to 80% of the predetermined stroke from the neutral position to the second shift position, a fourth, usually closed switch operatively associated with the link rod and connected in series with the first switch to be opened when the link rod moves by 60 to 80% of the predetermined stroke from the neutral position to the first shift position, and a fifth, usually closed switch operatively associated with the link rod and connected in series with the second switch to be opened when the link rod moves by 60 to 80% of the predetermined stroke from the neutral position to the second shift position.

2. A power transmission system of an engine driven vehicle having a change-gear transmission with an input shaft and an output shaft; a plurality of drive gears of different numbers of teeth freely rotatably mounted on the output shaft and constantly driven from the input shaft; a plurality of synchronizing assemblies mounted on the output shaft for sliding movement thereon, each said synchronizing assembly being slidably engageable with a corresponding drive gear for synchronization between the gear and the output shaft; a driver-operable gear shift lever having a neutral position and a plurality of gear shift positions including at least a first shift position and a second shift position in which the synchronizing assemblies engage the corresponding drive gears respectively; a link rod axially reciprocably movable with the gear shift lever for slide movement of the synchronizing assemblies by a predetermined stroke from the neutral position to the first shift position or to the second shift position; an electrically operable clutch to transmit torque of an engine to the transmission; and a clutch control circuit comprising an electric actuator providing engagement of said clutch in respose to opening of said clutch control circuit;

a first switch located on the gear shift lever to be closed while the driver is applying a force to move the gear shift lever toward the shift position, a second switch located on the gear shift lever to be closed while the driver is applying a force to move the shift lever toward the second shift position;

third, fourth and fifth, usually closed switches connected in parallel with each other and located stationarily on the transmission, each said switch having a switch actuating member extending through the stationary portion and engageable in one of three axial grooves circumferentially contiguously formed on the cylindrical surface of said link rod, wherein each said switch is closed when the actuating member is engaged in the corresponding one of the grooves while being opened when the member rides over the remaining cylindrical surface of the link rod;

the axial groove for the third switch having the length of 60 to 80% of the predetermined stroke from the neutral position respectively to the first and second shift positions, the axial groove for the fourth switch having the length of 60 to 80% of the predetermined stroke from the neutral position to the first shift position and the length of 100% of the predetermined stroke from the neutral position to the second shift position, and the axial groove for the fifth switch having the length of 60 to 80% of the predetermined stroke from the neutral position to the second shift position and the length of 100% of the predetermined stroke from the neutral position to the first shift position said first and second switches being connected in parallel with said electric actuator, said fourth and fifth switches being connected in series with said first and second switches respectively, said third switch being connected in parallel with said series connected first and fourth and second and fifth switches to provide, during any one shift operation two channels for current to flow through said actuator irrespective of a failure of any one of said first, second, third, fourth and fifth switches whereby the actuator will be energized to permit substantially normal shifting of gears.

3. In an automotive power transmission having an electrically controlled clutch, and a shift lever movable from a neutral position to at least first and second shift positions, a clutch control circuit having
   an electric actuator for disengaging the clutch when energized,
   a first switch located on the gear shift lever and which is closed while the driver applies to force to move the gear shift lever to said first shift position,
   a second switch located on the gear shift lever and closed while the driver applies a force to move the gear shift lever to said second shift position,
   said first and second switches being connected to parallel with said electric actuator,
   third, fourth and fifth switches, each of which is operated by the movement of said gear shift lever,
   said fourth and fifth switches being connected in series with said first and second switches respectively and said third switch connected in parallel with the series connected first and fourth and second and fifth switches,
   said third, fourth and fifth switches being normally closed, said third switch being operable to open when the gear shift lever reaches a first predetermined position short of either one of said first and second shift positions, said fourth switch being operable to open when said gear shift lever reaches a second predetermined position short of said first shift position, and said fifth switch being operable to open when said gear shift lever reaches a third predetermined position short of said second shift position.

* * * * *